United States Patent [19]

Möhring et al.

[11] Patent Number: 5,183,830
[45] Date of Patent: Feb. 2, 1993

[54] METHOD FOR THE PREPARATION OF HIGHLY ELASTIC FORMS OF REDUCED COMPRESSION HARDNESS HAVING POLYURETHANE GROUPS

[75] Inventors: Volker Möhring, Mülheim/Ruhr; Volker Zellmer, Bottrop, both of Fed. Rep. of Germany

[73] Assignee: Th. Goldschmidt AG, Essen, Fed. Rep. of Germany

[21] Appl. No.: 686,127

[22] Filed: Apr. 15, 1991

[30] Foreign Application Priority Data

May 7, 1990 [DE] Fed. Rep. of Germany ....... 4014537

[51] Int. Cl.$^5$ ............................................ C08G 18/48
[52] U.S. Cl. .................................... 521/107; 521/114; 521/115; 521/164; 521/169; 521/172; 521/174; 521/175
[58] Field of Search ............... 521/107, 114, 115, 164, 521/169, 172, 174, 175

[56] References Cited

U.S. PATENT DOCUMENTS

| | | | |
|---|---|---|---|
| 4,208,485 | 6/1980 | Nahta | 521/107 |
| 4,235,811 | 11/1980 | Schultz et al. | 252/530 |
| 4,751,251 | 6/1988 | Thornsberry | 521/112 |
| 4,764,541 | 8/1988 | Brasington | 521/114 |
| 4,990,373 | 2/1991 | Kittle | 521/65 |

*Primary Examiner*—Maurice J. Welsh
*Assistant Examiner*—Rachel F. Johnson
*Attorney, Agent, or Firm*—Anderson Kill Olick & Oshinsky

[57] ABSTRACT

A method for the preparation of highly elastic foams of reduced compression hardness and having urethane groups is disclosed, in which the reaction of the polyurethane-forming materials is carried in the presence of 0.01 to 5% by weight, based on the polyol, of a compound, which has at least one polyoxyalkylene group and at least one anionic group in the molecule. The use of fluorocarbons to decrease the compression hardness can reduced appreciably by the use of this compound.

7 Claims, No Drawings

METHOD FOR THE PREPARATION OF HIGHLY ELASTIC FORMS OF REDUCED COMPRESSION HARDNESS HAVING POLYURETHANE GROUPS

BACKGROUND OF THE INVENTION

The invention is directed to a method for the preparation of highly elastic foams of reduced compression hardness having urethane groups by the reaction of polyethers having a molecular weight of 400 to 10,000 and containing at least two hydroxyl groups with polyisocyanates in the presence of cross-linking agents, catalysts and water and optionally in the presence of emulsifiers, stabilizers, organic blowing agents and further auxiliaries and additives.

Flexible polyurethane foams are used to a large extent in upholstered furniture and automobile industries. For the different uses and the different qualities desired therefor, it is necessary to be able to vary the apparent density and primarily also the compression hardness over a wide range.

Inorganic and organic fillers have already been used for preparing foams with increased compression hardness. The compression hardness can also be increased by polymerization reactions of the polyols used for foaming.

Compression hardness is lowered by the use of physical blowing agents, such as fluorocarbons or methylene chloride. The use of these materials is contrary to the endeavor, for environmental reasons, to limit the use of fluorocarbons as much as possible. The same is true for methylene chloride, which is physiologically not safe.

In formulations in which inert fillers are used in order to obtain other foam properties instead of an increase in hardness, according to the state of the art, the use of physical blowing agents is even indispensable when flexible foams are to be obtained. For example, considerable amounts of melamine or aluminum hydroxide are used in order to manufacture upholstered furniture and mattresses of high flame resistance on the basis of highly elastic, so-called HR foams. The increase in compression hardness, which is associated therewith, cannot be accepted for reasons of comfort, so that physical blowing agents must be used in considerable amounts.

The addition of compounds which contain at least one polyoxyalkylene group and at least one anionic group to formulations for the production of polyurethane foams is known from the art.

For example, the use of a mixture of polyoxyalkylene alkyl ether sulfate and a polyoxyethylene/polyoxypropylene polymer as emulsifier and dispersing agent for the manufacture of flexible polyester urethane foams is described in CS patent 253;786.

The use of anionic surfactants as foam stabilizers for the preparation of flexible polyester polyurethane foams is known from the German Offenlegungsschrift 11 78 595.

The use of nonylphenol·polyoxyethylene ether sulfates as foam stabilizers for the preparation of rigid polyurethane or polyisocyanurate foams can be inferred from U.S. Pat. No. 4,751,251.

Japanese patent 56/152 826 discloses the use of carboxymethylated polyether polyols as trimerizing catalysts for the preparation of rigid polyisocyanurate foams. Derivatives of aminated, alkoxylated aliphatic alcohols with sulfonate or carboxylate groups as trimerization catalysts for forming rigid polyisocyanurate foams is disclosed in the U.S. Pat. No. 4,235,811.

However, the use of such anionic surfactants for the preparation of highly elastic, so-called high resilient polyurethane foams cannot be inferred from the state of the art; nor is the use known of such surfactants for the preparation of polyurethane foams of reduced compression hardness.

SUMMARY OF THE INVENTION

An object of the invention is to provide a method for the preparation of foams within a wide range of apparent densities using technically simple means, wherein the foams have a low compression hardness at the given apparent density.

Another object of the invention is to provide a method for the preparation of foams within a wide range of apparent densities, wherein the use of fluorocarbons is limited as much as possible.

These and other objects are attained by the invention described below.

Surprisingly it has been discovered that the objects of the invention can be accomplished by carrying out the reaction of the polyurethane-forming agents in the presence of a compound Y which contains at least one polyoxyalkylene group and at least one anionic group in the molecule, in an amount of 0.01 to 5% by weight, based on the polyol.

DESCRIPTION OF THE INVENTION

According to the invention, the structure of compound Y is variable over a wide range and need only fulfill the condition that it has at least one polyoxyalkylene group and at least one anionic group in the molecule.

As compound Y, preferably a compound of the following formula is used

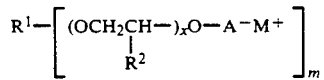

wherein
$R^1$ is a hydrogen or an m-valent alkyl, aryl or alkylaryl group and the alkyl group in each case has 1 to 22 carbon atoms,
$R^2$ is the same or different in the polymeric molecule and represents a hydrogen, methyl or ethyl group,
A is an inorganic or organic anionic group,
M is a cation, which has a positive charge, which corresponds to the negative charge of the anion,
m has a value of 1 to 8, but is 1 when $R^1$ is hydrogen and
x has an average value of 1 to 100.

As an alkyl group, the $R^1$ group has 1 to 22 carbon atoms. The alkyl group is preferably linear and has, in particular, 1 to 8 carbon atoms. As the aryl group, the phenyl group, which is optionally substituted, is preferred. Examples of alkylaryl groups are the octylphenyl, nonylphenyl and dodecylphenyl groups.

A is an inorganic or organic group. Examples of such groups are $-SO_3$, $-CH_2CH_2-SO_3$, $-(CH_2)_3-SO_3$, $-CH_2-CH(CH_3)-CH_2-SO_3$, $-CH_2-CH(OH)-CH_2-SO_3$, $-CH_2-CH(OH)-CH_2-S_2O_3$, $-Z-COO-$ (Z=a divalent, optionally substituted hydrocarbon group), $-CO-Z-COO-$, $PO_3$, $PO_2$, $-(CH_2)_n-PO_3$, $-(CH_2)_n-PO_2$ (n=1, 2, 3 or 4).

The cation M preferably is an alkali, alkaline earth, Mn, Fe, Co, Ni, Cu, Zn, Al, NH$_4$, alkylammonium or hydroxyalkylammonium ion. The alkyl group of the alkylammonium ion has 1 to 4 carbon atoms and the alkyl group of the hydroxyalkyl group has 2 to 4 carbon atoms.

Compounds of formula I may be obtained by the well known addition reaction between alkylene oxides and compounds containing active hydrogen atoms and the subsequent introduction of the anionic group. Alcohols in particular come into consideration as compounds having active hydrogens. Literature references, appropriate for the synthesis of anionic compounds, may be found in the Tensid-Taschenbuch (Surfactant Handbook), published by Carl Hanser Verlag, 1981, pages 85 to 167, and in Ullmann's Encyclopädie der technischen Chemie (Encyclopedia of Industrial Chemistry), published by Verlag Chemie, 1982, 4th edition, volume 22, pages 468 to 469.

Examples of suitable compounds are: (the symbols Y1, Y2, etc. serve to identify the products in the examples and the Tables)
A=—SO$_3$; polyalkylene sulfates such as CH$_3$—(CH$_2$—)$_{11}$(OCH$_2$—CH$_2$—)$_{20}$—SO$_3^-$Na$^+$  Y1

C$_9$H$_{19}$—Ph—(OCH$_2$—CH$_2$—)$_{20}$O—SO$_3^-$Na$^+$  Y2

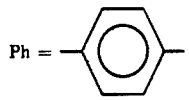

A=—CH$_2$CH$_2$—SO$_3$: polyoxyalkylene sulfonates such as

H—(OCH$_2$—CH$_2$—)$_{15}$O—CH$_2$CH$_2$—SO$_3^-$Na$^+$

Na$^-$SO$_3^-$—CH$_2$CH$_2$—O—(CH$_2$CH$_2$—O—)$_6$(CH$_2$—)$_4$(O—CH$_2$—CH$_2$)$_6$O—CH$_2$CH$_2$—SO$_3^-$Na$^+$  Y3

A=—(CH$_2$—)$_3$SO$_3$, —CH$_2$—CH(CH$_3$)—CH$_2$—SO$_3$: polyoxyalkylenepropyl or polyoxyalkylene-2-methylpropyl sulfonates such as

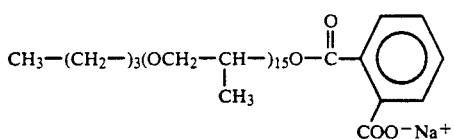

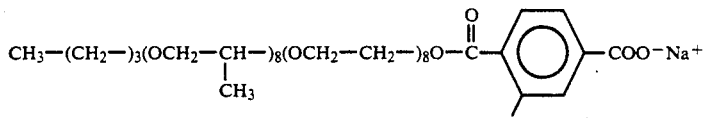

H—(OCH$_2$—CH$_2$—)$_{10}$(OCH$_2$—CH(CH$_3$)—)$_8$O—(CH$_2$—)$_3$SO$_3^-$K$^+$  Y4

H—(OCH$_2$—CH$_2$—)$_{30}$(OCH$_2$—CH(C$_2$H$_5$)—)$_5$O—(CH$_2$—)$_3$SO$_3^-$NH$_4^+$  Y5

GL—[(OCH$_2$—CH$_2$—)$_{10}$(OCH$_2$—CH(CH$_3$)—)$_{12}$O—CH$_2$—CH(CH$_3$)—CH$_2$—SO$_3^-$Na$^+$]$_3$  Y6

(GL=the

—H$_2$C—CH—CH$_2$—
      | group derived from glycerine)
A=—CH$_2$—CH(OH)—CH$_2$—SO$_3$: polyoxyalkylenehydroxypropyl sulfonates such as:
CH$_3$—(CH$_2$—)$_3$(OCH$_2$—CH$_2$—)$_4$O—CH$_2$—CH(OH)—CH$_2$—SO$_3^-$Na$^+$ SR—[(OCH$_2$—CH$_2$—)$_4$(OCH$_2$—CH(CH$_3$)—)$_4$O—CH$_2$—CH(OH)—CH$_2$—SO$_3^-$Na$^+$]$_6$  Y7

(SR=the

—H$_2$C—(CH—)$_4$CH$_2$—
      | group derived from sorbitol)
A=—CH$_2$—CH(OH)—CH$_2$—S$_2$O$_3$: polyoxyalkylenehydroxypropyl thiosulfates (Bunte salts) such as

[CH$_3$—(OCH$_2$CH(CH$_3$)—)$_8$O—CH$_2$—CH(OH)—CH$_2$—S$_2$O$_3^-$]$_2$Mg$^{2+}$  Y8

CH$_3$—(OCH$_2$—CH$_2$—)$_{12}$O—CH$_2$—CH(OH)—CH$_2$—S$_2$O$_3^-$K$^+$

A=—Z—COO polyoxyalkylene alkyl ether carboxylates such as
Na$^+$ $^-$OOC—CH$_2$—O—(CH$_2$—CH$_2$—CH$_2$O—)$_4$CH$_2$CH$_2$—(OCH$_2$—CH$_2$—)$_4$O—CH$_2$—COO$^-$Na$^+$ C$_9$H$_{19}$—Ph—(OCH$_2$—CH$_2$—)$_8$O—CH$_2$CH$_2$—COO$^-$NH$_4^+$  Y9

CH$_3$—(OCH$_2$—CH$_2$—)$_6$(OCH$_2$—CH(CH$_3$)—)$_4$O—CH$_2$—Ph—CO$^-$Na$^+$

A=—CO—Z—COO: half ester carboxylates of polyoxyalkylenes such as

[CH$_3$—(CH$_2$—)$_7$(OCH$_2$—CH$_2$—)$_8$O—CO—CH=CH—COO$^-$]$_2$Ca$^{2+}$  Y10

A=—PO$_3$: polyoxyalkylene phosphates (mono- and diesters) such as

CH$_3$—(CH$_2$—)$_{11}$(OCH$_2$—CH$_2$—)$_7$O—PO$_3^{2-}$·2Na$^+$  Y12

[C$_9$H$_{19}$—Ph—(OCH$_2$—CH$_2$—)$_9$O—]$_2$PO$_2^-$K$^+$

A=—PO$_2$: polyoxyalkylene phosphites such as

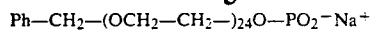

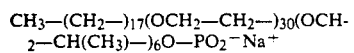 Y13

A=—(CH$_2$—)$_n$PO$_3$: polyoxyalkylene phosphonates such as

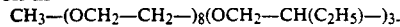

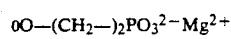 Y14

$C_4H_9$—Ph—(OCH$_2$—CH$_2$—)$_{15}$O—(CH$_2$—)$_4$-PO$_3^{2-}$2K$^+$

A=—(CH$_2$—)$_n$PO$_2$: polyoxyalkylene phosphinates such as

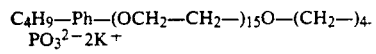

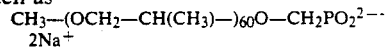 Y15

Furthermore, compounds of the following formula

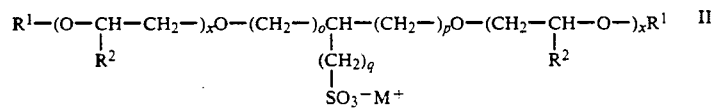 II wherein R$^1$, R$^2$, M and x have the meaning already given and o, p and q are the same or different and in each case have values from 0 to 7, with the proviso that the sum of o+p+q is at least equal to 3, are preferably used as compound Y.

These compounds can be obtained by alkoxylation of sulfonated alkene diols. Examples of suitable diols are 2-butene-1,4-diol, 1-butene-3,4-diol, isobutene-1,3-diol and 2-methyl-2-butene-1,4-diol. The sulfonation is carried out by the addition of compounds of formula HSO$_3$M to the double bond of the diol.

Examples of suitable compounds are:

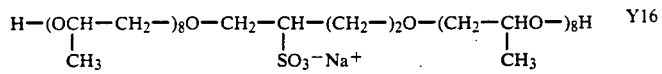 Y16

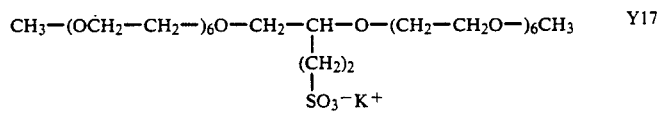 Y17

A further group of compounds Y, the use of which is preferred, corresponds to the general formula

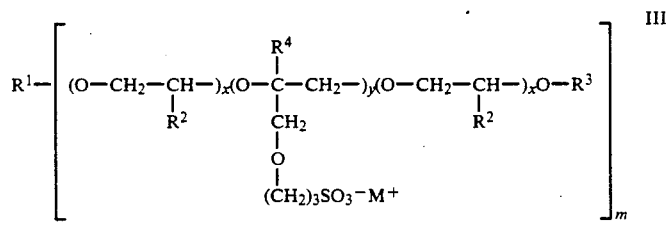 III wherein R$^1$, R$^2$, M, m and x have the meaning already given, R$^3$ is a hydrogen, alkyl, aryl or alkylaryl group and the alkyl groups have 1 to 22 carbon atoms, R$^4$ is a hydrogen or methyl group and y is equal to m or a multiple of m.

The synthesis of compounds III is described in the German patent 36 33 421. It is accomplished by the addition reaction of alkylene oxides and allyl and/or methallyl glycidyl ethers with monohydric or multihydric alcohols and the addition of HSO$_3$M to the olefinic double bond. Examples of suitable compounds are:

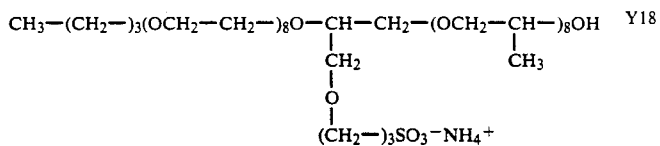 Y18

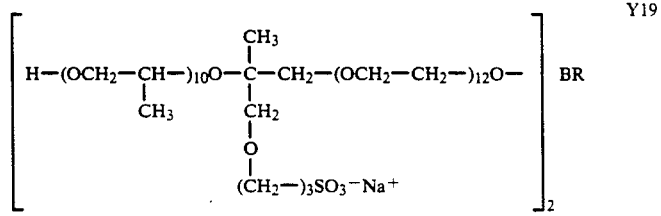 Y19

(BR=the group —(CH$_2$—)$_4$ derived from butane-1,4-diol)

Further preferable compounds Y correspond to the general formula $$R^5-CH_2O-(CH_2-CH(R^2)-O-)_xCH_2-CH(R^4)-CH_2-SO_3^-M^+ \qquad \text{IV}$$

wherein $R^2$, $R^4$, x and M have the meaning already given, and $R^5$ represents the HO—$CH_2$—CH(OH)— or OH—$CH_2$—C($CH_2$OH)($R^6$)— group, and in which $R^6$ is a methyl, ethyl or propyl group.

Such compounds are described in the European patent 0 158 053. They can be obtained by the allylation of ketalized 1,2- or 1,3 polyether diols, followed by deketalization and sulfonation with $HSO_3M$. It is also possible to sulfonate first and to carry out the ketalization in a second step. Examples of such compounds are:

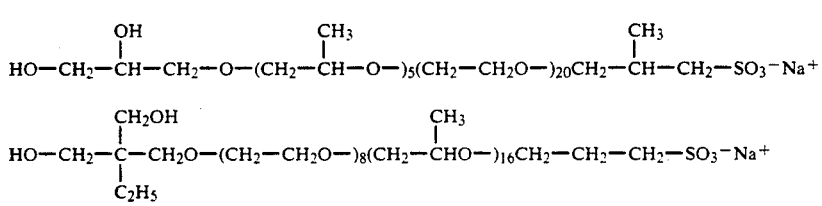

It is furthermore possible to use advantageously in the inventive method compounds Y which correspond to the following formula:

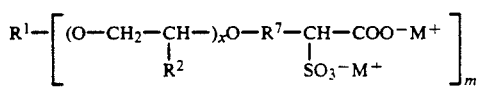

wherein $R^1$, $R^2$, M, x and m have the meaning already given, $R^7$ is a divalent alkyl group with 1 to 22 carbon atoms, a divalent aryl or alkylaryl group or a group having the formula —CO—$CH_2$—.

The half-esters of sulfosuccinic acid ($R^7=$—CO—$CH_2$—) can be obtained by the sulfonation of the half-ester of maleic acid. The α-sulfoalkyl polyoxyalkylene ether carboxylates can be obtained by the sulfonation of the corresponding alkyl polyoxyalkylene ether carboxylates.

Examples of these compounds are:

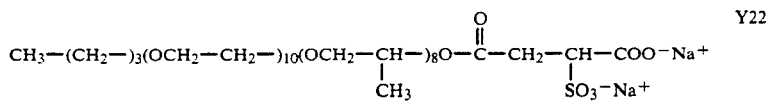

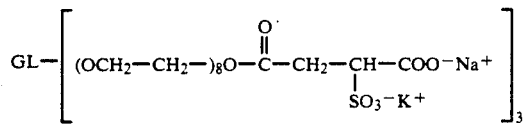

(GL = the $$-H_2C-CH-CH_2-$$

group derived from glycerin)

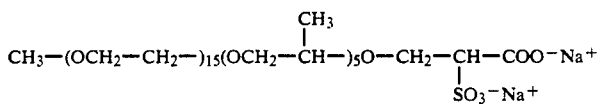

Finally, the following compounds also are preferred as compounds Y

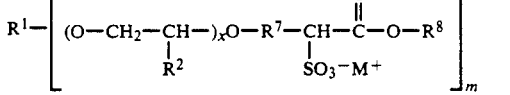

wherein $R^1$, $R^2$, $R^7$, M, x and m have the meaning already given, $R^8$ has the meaning of $R^1$ or represents the $R^1-(O-CH_2-CH(R^2)-)_x$ group.

The sulfosuccinic diesters can be obtained by the sulfonation of maleic diesters ($R^7=$—CO—$CH_2$—) and the α-sulfoalkyl polyoxyalkylene ether esters can be obtained by the sulfonation of the appropriate alkyl polyoxyalkylene ether esters.

Examples of such compounds are:

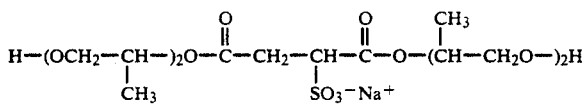

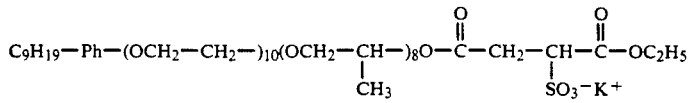

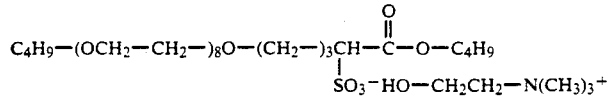

The preparation of HR block and molded foams is known and is described, for example, in "Flexible Polyurethane Foams, Chemistry and Technology," Applied Science Publishers, 1982, pages 133 to 139 and 158 to 173. Further information can be obtained from the "Kunststoff-Handbuch" (Plastic Handbook), vol. 7, published by Carl Hanser Verlag, 1983. According to these references, highly elastic foams are obtained by the combination of high molecular weight, highly active, polyether polyols, with as high a primary OH end group content as possible, and polyfunctional isocyanates in the presence of suitable cross-linking agents.

In German patents 25 07 161 and 26 03 498, the preparation is described of highly elastic foams from highly reactive polyether polyols, which are built up exclusively from alkylene oxides, and diisocyanates with addition of crystalline cross linking agents, which are insoluble or only slightly soluble in the polyether polyol at room temperature. However, it is also in keeping with the state of the art to use polyether polyols which contain organic fillers, such as the so-called polymer, PHD or PIPA polyols, which can be prepared in the form of sedimentation-resistant dispersions by the reaction of organic monomers in the polyether polyol. For this reaction, alkanolamines and/or higher functional alcohols are usually used as cross linking agents.

The inventive method and the properties of the foams prepared by this method are described in even greater detail by means of the following examples.

For these examples, the following products are used and the following product names are employed:

polyol A: conventional, commercial, highly reactive HR polyol with predominantly primary OH end groups. The OH number is approximately 36.

polyol B: conventional, commercial, highly reactive HR polyol, which contains a sedimentation-resistant polyurea dispersion as filler (a so-called PHD polyol). The OH number is approximately 28.

polyol C: conventional, commercial highly reactive HR polyol, which contains a sedimentation-resistant dispersion of a copolymer based on styrene and acrylonitrile (so-called polymer polyol). The OH number is approximately 30.

polyol D: the HR polyol of German patent 31 03 757, which contains a sedimentation-resistant polyurethane dispersion (through an in situ reaction of an isocyanate with an alkanolamine in a polyol of type A) (so-called PIPA polyol)

DEOA: N,N-diethanolamine

Ortegol ®204: conventional, commercial cross-linking agent of German patents 25 07 161 and 26 03 498

TEGOAMINE ®BDE: 70% solution of bis(2-dimethylaminoethyl) ether in dipropylene glycol TEGOAMINE ®33: 33% solution of triethylenediamine in dipropylene glycol Kosmos ®29: tin(II) octoate Kosmos ®19: dibutyl tin(IV) dilaurate Tegostab ®B 8681: conventional, commercial foam stabilizer for the preparation of HR block and molded foams melamine: conventional, commercial melamine, with an average particle size of 20 μm F 11: trichlorofluoromethane Desmodur ®T 80: conventional commercial toluylene diisocyanate, characterized by an isomer ratio (2,4- to 2,6-) of 80:20 compound Y of the invention

The foam is prepared according to the so-called hand foaming method. For this method, all the components, with the exception of the isocyanate and, if necessary, the physical blowing agent, are prestirred for 60 seconds at 1,000 rpm. The isocyanate and, if necessary, the blowing agent are added subsequently and stirring is continued for a further 7 seconds at 2,500 rpm. The liquid mixture is then added to an open container having the dimensions of 30 cm×30 cm×30 cm, so that the foam can rise freely.

The bulk density and the compression hardness of the foam are determined after a 72-hour storage under standard atmospheric conditions, that is, at 23°±1° C. and 50±2% relative humidity. The compression hardness is determined by the method of DIN 53 577 at 40% compression.

TABLE 1

Formulations
(Data in % by Weight)

| | Formulation | | | | | | | | | |
|---|---|---|---|---|---|---|---|---|---|---|
| | 1 | 2 | 3 | 4 | 5 | 6 | 7 | 8 | 9 | 10 |
| Polyol A | 100 | 100 | 100 | 100 | 100 | 100 | 100 | 100 | 100 | 100 |
| Polyol B | — | — | — | — | — | — | — | — | — | — |
| Polyol C | — | — | — | — | — | — | — | — | — | — |
| Polyol D | — | — | — | — | — | — | — | — | — | — |
| Water (total) | 2.5 | 3.0 | 3.5 | 4.0 | 2.5 | 2.5 | 3.0 | 3.0 | 2.5 | 3.0 |
| DEOA | 0.5 | 0.5 | 0.5 | 0.5 | 0.5 | 0.5 | 0.5 | 0.5 | 0.5 | 0.5 |
| Ortegol ®204 | 3.0 | 3.0 | 3.0 | 3.0 | 3.0 | 3.0 | 3.0 | 3.0 | 3.0 | 3.0 |
| Kosmos ®29 | 0.15 | 0.15 | 0.15 | 0.15 | 0.15 | 0.15 | 0.15 | 0.15 | 0.15 | 0.15 |
| Kosmos ®19 | — | — | — | — | — | — | — | — | — | — |
| TEGOAMINE ®BDE | 0.12 | 0.10 | 0.08 | 0.06 | 0.12 | 0.12 | 0.10 | 0.10 | 0.12 | 0.10 |
| TEGOAMINE ®33 | 0.4 | 0.4 | 0.4 | 0.4 | 0.4 | 0.4 | 0.4 | 0.4 | 0.4 | 0.4 |
| Tegostab ®B 8681 | 1.0 | 1.0 | 1.0 | 1.0 | 1.0 | 1.0 | 1.0 | 1.0 | 1.0 | 1.0 |
| F 11 | — | — | — | — | 5 | 10 | 5 | 10 | — | — |
| Melamine | 25 | 25 | 25 | 25 | 25 | 25 | 25 | 25 | 25 | 25 |
| Desmodur ®T 80 | 35.1 | 39.9 | 44.7 | 49.6 | 35.1 | 35.1 | 39.9 | 39.9 | 35.1 | 39.9 |
| Inventive Compound (Y) | — | — | — | — | — | — | — | — | 1.0 | 1.0 |

TABLE 1-continued

Formulations
(Data in % by Weight)*

| | Formulation | | | | | | | | | |
|---|---|---|---|---|---|---|---|---|---|---|
| | 11 | 12 | 13 | 14 | 15 | 16 | 17 | 18 | 19 | 20 |
| Polyol A | 100 | 100 | 100 | 100 | 100 | — | — | — | — | — |
| Polyol B | — | — | — | — | — | 100 | 100 | 100 | 100 | 100 |
| Polyol C | — | — | — | — | — | — | — | — | — | — |
| Polyol D | — | — | — | — | — | — | — | — | — | — |
| Water (total) | 3.5 | 4.0 | 3.5 | 3.0 | 3.5 | 3.0 | 3.5 | 3.0 | 4.0 | 3.0 |
| DEOA | 0.5 | 0.5 | 0.5 | 0.5 | 0.5 | 1.0 | 1.0 | 1.0 | 1.0 | 0.5 |
| Ortegol ®204 | 3.0 | 3.0 | 3.0 | 3.0 | 3.0 | — | — | — | — | 3.0 |
| Kosmos ®29 | 0.15 | 0.15 | 0.15 | 0.15 | 0.15 | 0.15 | 0.15 | 0.15 | 0.15 | 0.15 |
| Kosmos ®19 | — | — | — | — | — | — | — | — | — | — |
| TEGOAMINE ®BDE | 0.08 | 0.06 | 0.05 | 0.1 | 0.1 | 0.05 | 0.05 | 0.05 | 0.03 | 0.05 |
| TEGOAMINE ®33 | 0.4 | 0.4 | 0.3 | 0.3 | 0.3 | 0.3 | 0.3 | 0.3 | 0.3 | 0.3 |
| Tegostab ®B 8681 | 1.0 | 1.0 | 0.8 | 0.8 | 0.8 | 0.8 | 0.8 | 0.8 | 0.8 | 0.8 |
| F 11 | — | — | — | 5 | — | — | — | 5 | — | — |
| Melamine | 25 | 25 | — | — | — | 25 | 25 | 25 | 25 | 25 |
| Desmodur ®T 80 | 44.7 | 49.6 | 44.7 | 39.9 | 44.7 | 36.4 | 41.1 | 36.4 | 46.1 | 36.4 |
| Inventive Compound (Y) | 1.0 | 1.0 | — | — | 1.0 | — | — | 1.5 | 1.5 | 1.5 |

| | Formulation | | | | | | | | | |
|---|---|---|---|---|---|---|---|---|---|---|
| | 21 | 22 | 23 | 24 | 25 | 26 | 27 | 28 | 29 | 30 |
| Polyol A | — | — | — | — | — | — | 100 | 100 | 100 | 100 |
| Polyol B | — | — | — | — | — | — | — | — | — | — |
| Polyol C | 100 | 100 | 100 | 100 | — | — | — | — | — | — |
| Polyol D | — | — | — | — | 100 | 100 | — | — | — | — |
| Water (total) | 3.0 | 3.5 | 3.0 | 4.0 | 3.0 | 3.0 | 3.5 | 3.5 | 3.5 | 3.5 |
| DEOA | 1.0 | 1.0 | 1.0 | 1.0 | 0.13 | 0.13 | 0.5 | 0.5 | 0.5 | 0.5 |
| Ortegol ®204 | — | — | — | — | — | — | 3.0 | 3.0 | 3.0 | 3.0 |
| Kosmos ®29 | — | — | — | — | — | — | 0.15 | 0.15 | 0.15 | 0.15 |
| Kosmos ®19 | 0.1 | 0.1 | 0.1 | 0.1 | 0.05 | 0.05 | — | — | — | — |
| TEGOAMINE ®BDE | 0.5 | 0.5 | 0.5 | 0.03 | 0.12 | 0.12 | 0.08 | 0.08 | 0.08 | 0.08 |
| TEGOAMINE ®33 | 0.15 | 0.15 | 0.15 | 0.15 | — | — | 0.4 | 0.4 | 0.4 | 0.4 |
| Tegostab ®B 8681 | 1.0 | 1.0 | 1.0 | 1.0 | 0.4 | 0.4 | 1.0 | 1.0 | 1.0 | 1.0 |
| F 11 | — | 5 | — | — | — | — | — | — | — | — |
| Melamine | 25 | 25 | 25 | 25 | 25 | 25 | 25 | 25 | 25 | 25 |
| Desmodur ®T 80 | 35.7 | 41.0 | 35.7 | 46.4 | 39.4 | 39.4 | 44.7 | 44.7 | 44.7 | 44.7 |
| Inventive Compound (Y) | — | — | 1.5 | 1.5 | — | 1.5 | 1.0 | 3.0 | 5.0 | * |

*compound not of the invention $C_9H_{19}\text{-}C_6H_4\text{-}SO_3Na$

TABLE 2

| Example Number | Formulation According to Table 1 Number | Compound Y (See Above Description) | Density (kg/m³) | Compression Hardness (kPa) |
|---|---|---|---|---|
| 1 | 1 | — | 43.6 | 3.1 |
| 2 | 2 | — | 37.0 | 2.9 |
| 3 | 3 | — | 32.1 | 2.7 |
| 4 | 4 | — | 29.2 | 2.7 |
| 5 | 5 | — | 37.1 | 2.4 |
| 6 | 6 | — | 31.8 | 1.8 |
| 7 | 7 | — | 31.6 | 2.3 |
| 8 | 8 | — | 28.9 | 1.8 |
| 9 | 9 | Y1 | 44.8 | 2.7 |
| 10 | 9 | Y2 | 44.6 | 2.3 |
| 11 | 9 | Y3 | 44.0 | 2.5 |
| 12 | 9 | Y4 | 44.3 | 2.2 |
| 13 | 9 | Y5 | 44.5 | 2.6 |
| 14 | 9 | Y6 | 43.7 | 2.3 |
| 15 | 10 | Y7 | 37.0 | 2.1 |
| 16 | 10 | Y8 | 37.3 | 2.2 |
| 17 | 10 | Y9 | 37.6 | 2.6 |
| 18 | 10 | Y10 | 37.1 | 2.0 |
| 19 | 10 | Y11 | 37.1 | 2.3 |
| 20 | 10 | Y12 | 37.4 | 2.2 |
| 21 | 10 | Y13 | 36.9 | 2.5 |
| 22 | 10 | Y14 | 37.3 | 2.6 |
| 23 | 10 | Y15 | 37.6 | 2.2 |
| 24 | 11 | Y16 | 33.2 | 1.9 |
| 25 | 11 | Y17 | 32.8 | 1.8 |
| 26 | 11 | Y18 | 32.5 | 2.2 |
| 27 | 11 | Y19 | 32.7 | 1.8 |
| 28 | 11 | Y20 | 32.4 | 2.1 |
| 29 | 11 | Y21 | 32.6 | 2.3 |
| 30 | 12 | Y22 | 29.4 | 2.5 |
| 31 | 12 | Y23 | 29.2 | 2.3 |
| 32 | 12 | Y24 | 29.0 | 1.7 |
| 33 | 12 | Y25 | 29.6 | 2.3 |
| 34 | 13 | — | 25.6 | 1.6 |
| 35 | 14 | — | 26.0 | 1.1 |
| 36 | 15 | Y4 | 25.7 | 1.1 |
| 37 | 16 | — | 35.8 | 2.6 |
| 38 | 17 | — | 27.8 | 2.1 |
| 39 | 18 | Y4 | 36.4 | 2.0 |
| 40 | 19 | Y4 | 27.2 | 2.0 |
| 41 | 20 | Y4 | 36.2 | 2.0 |
| 42 | 21 | — | 35.8 | 3.1 |
| 43 | 22 | — | 27.5 | 2.5 |
| 44 | 23 | Y10 | 36.0 | 1.9 |
| 45 | 24 | Y10 | 27.8 | 2.0 |
| 46 | 25 | — | 34.8 | 4.4 |
| 47 | 26 | Y19 | 35.0 | 3.5 |
| 48 | 27 | Y20 | 33.2 | 2.0 |
| 49 | 28 | Y20 | 33.4 | 1.7 |
| 50 | 29 | Y20 | 33.1 | 1.5 |

TABLE 2-continued

| Example Number | Formulation According to Table 1 Number | Compound Y (See Above Description) | Foamings Density (kg/m³) | Compression Hardness (kPa) |
|---|---|---|---|---|
| 51 | 30 | * | 32.1 | 2.7 |

*compound not of the invention 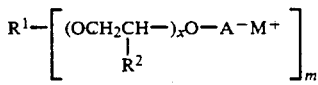

Comparison of Examples 9 to 33 (Formulations 9 to 12) with Examples 1 to 4 (Formulations 1 to 4) shows that when the inventive compound Y is used, a significant reduction in the compression hardness is possible over a wide range of specific gravities. This reduction in compression hardness is tantamount to the replacement of physical blowing agents such as Frigen 11 (Examples 5 to 8, Formulations 5 to 8). Examples 34 to 36 (Formulations 13 to 15) confirm that even in foams which do not contain any inert fillers, such as melamine, addition of the compound Y in accordance with the invention results in a reduction of the compression hardness.

Examples 37 to 47 (Formulations 16 to 26) show that the inventive method is not limited to filled polyols of the A type, but can also be used in combination with PHD, polymer and PIPA polyols, which are commercially available.

The concentration of Y, based on 100% by weight of polyol, can be varied over a wide range, in order to arrive at foams of different compression hardness (Examples 48 to 50, Formulations 27 to 29).

Example 51 (Formulation 30) shows that compounds which do not contain any polyoxyalkylene groups cannot bring about a reduction in the compression hardness, despite the presence of the anionic group in the molecule. On the other hand, the desired result is obtained (Example 10, Formulation 9) in the presence of the polyalkylene group (compound Y2).

We claim:

1. A method for the preparation of highly elastic polyurethane foams of reduced compression hardness by the reaction of polyisocyanate with polyether having a molecular weight of 400 to 10,000 and containing at least two hydroxyl groups in the presence of cross-linking agent, catalyst and water and optionally in the presence of emulsifier, stabilizer and organic blowing agent, comprising carrying out the reaction of the polyurethane-forming components in the presence of a compound Y which contains at least one polyoxyalkylene group and at least one group $A^-M^{30}$ in the molecule, wherein A is an anionic group selected from the group consisting of $-SO_3$, $-CH_2CH_2-SO_3$, $-(CH_2)_3-SO_3$, $-CH_2-CH(CH_3)-CH_2-SO_3$, $-CH_2-CH(OH)-CH_2-SO_3$, $-CH_2-CH(OH)-CH_2-S_2O_3$, $-Z-COO-$ with Z being a divalent, optionally substituted hydrocarbon group, $-CO-Z-COO-$, $PO_3$, $PO_2$, $-(CH_2)_n-PO_3$, $-(CH_2)_n-PO_2$, with n=1, 2, 3 or 4, and wherein M is a cation selected from the group consisting of alkali metal, alkaline earth metal, Mn, Fe, Co, Ni, Cu, Zn, Al, NH_4, in an amount of 0.01 to 5% by weight, based on the weight of the polyether.

2. The method of claim 1, in which compound Y is a compound of the formula $$R^1-\left[(OCH_2CH-)_xO-A^-M^+\atop R^2\right]_m$$

wherein

R¹ is a hydrogen or an m-valent alkyl, aryl or alkylaryl group and the alkyl group in each case has 1 to 22 carbon atoms, R² are the same or different in the polymeric molecule and represent a hydrogen, methyl or ethyl group, A is an inorganic or organic anionic group, M is a cation, which has a positive charge, which corresponds to the negative charge of the anion, m has a value of 1 to 8, but is 1 when R¹ is hydrogen, and x has an average value of 1 to 100.

3. The method of claim 1, in which compound Y is a compound of the formula

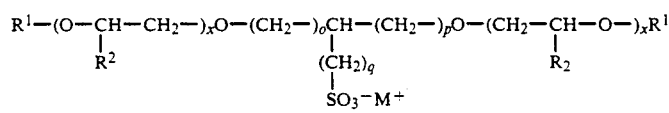

wherein

R¹ is a hydrogen or an alkyl, aryl or alkylaryl group and the alkyl group in each case has 1 to 22 carbon atoms, R² are the same or different in the polymeric molecule and represent a hydrogen, methyl or ethyl group, M is a cation, which corresponds to the negative charge of the anion, x has an average value of 1 to 100, and o, p and q are the same or different and in each case have a value of 0 to 7, with the proviso that the sum o+p+q is equal to at least 3.

4. The method of claim 1, in which compound Y is a compound of the formula

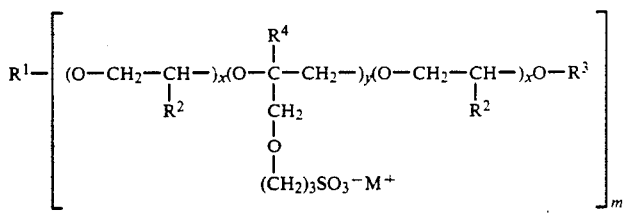

wherein
- $R^1$ is a hydrogen or an m-valent alkyl, aryl or alkylaryl group and the alkyl group in each case has 1 to 22 carbon atoms,
- $R^2$ are the same or different in the polymeric molecule and represent a hydrogen, methyl or ethyl group,
- M is a cation, which corresponds to the negative charge of the anion,
- m has a value of 1 to 8, but is 1 when $R^1$ is hydrogen,
- x has an average value of 1 to 100,
- $R^3$ is a hydrogen, alkyl, aryl or alkylaryl group and the alkyl group has 1 to 22 carbon atoms,
- $R^4$ is a hydrogen or methyl group and
- y is equal to m or a multiple of m.

5. The method of claim 1, in which compound Y is a compound of the formula

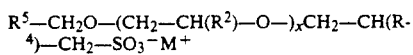

wherein
- $R^2$ are the same or different in the polymeric molecule and represent a hydrogen, methyl or ethyl group,
- $R^4$ is a hydrogen or methyl group,
- M is a cation, which corresponds to the negative charge of the anion,
- x has an average value of 1 to 100,
- $R^5$ represents the $OH-CH_2-CH(OH)-$ or $OH-CH_2-C(CH_2OH)(R^6)-$ group and
- $R^6$ is a methyl, ethyl or propyl group.

6. The method of claim 1, in which compound Y is a compound of the formula

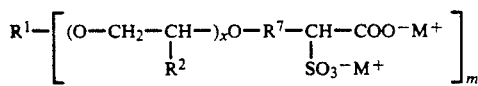

wherein

- $R^1$ is a hydrogen or an m-valent alkyl, aryl or alkylaryl group and the alkyl group in each case has 1 to 22 carbon atoms,
- $R^2$ are the same or different in the polymeric molecule and represent a hydrogen, methyl or ethyl group,
- M is a cation, which corresponds to the negative charge of the anion,
- x has an average value of 1 to 100,
- m has a value of 1 to 8, but is 1 when $R^1$ is hydrogen, and
- $R^7$ is a divalent alkyl group with 1 to 22 carbon atoms, a divalent aryl or an alkylaryl group or a group of formula $$-CO-CH_2-.$$

7. The method of claim 1, in which compound Y is a compound of the formula

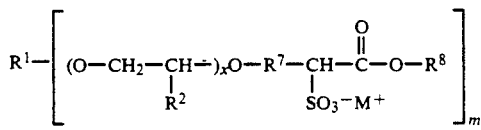

wherein
- $R^1$ is a hydrogen or an m-valent alkyl, aryl or alkylaryl group and the alkyl group in each case has 1 to 22 carbon atoms,
- $R^2$ are the same or different in the polymeric molecule and represent a hydrogen, methyl or ethyl group,
- $R^7$ is a divalent alkyl group with 1 to 22 carbon atoms, a divalent aryl or an alkylaryl group,
- M is a cation, which corresponds to the negative charge of the anion,
- x has an average value of 1 to 100,
- m has a value of 1 to 8, but is 1 when $R^1$ is hydrogen, and
- $R^8$ has the meaning of $R^9$ or is the $R^9-(OCH_2-CH(R^2)-)_x$ group, where $R^9$ is a hydrogen or an alkyl, aryl or alkylaryl group and the alkyl group in each case has 1 to 22 carbon atoms.

* * * * *